United States Patent
Carlsson et al.

(12)

(10) Patent No.: US 9,469,273 B2
(45) Date of Patent: Oct. 18, 2016

(54) BELT BUCKLE ARRANGEMENT WITH A BELT BUCKLE PIVOTABLY MOUNTED ON A HOLDER

(71) Applicant: Autoliv Development AB, Vårgårda (SE)

(72) Inventors: Göran Carlsson, Vågarda (SE); Mikael Jansson, Vargön (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/815,041

(22) Filed: Jul. 31, 2015

(65) Prior Publication Data

US 2016/0031413 A1 Feb. 4, 2016

(30) Foreign Application Priority Data

Aug. 1, 2014 (DE) .......................... 10 2014 110 955

(51) Int. Cl.

| B60R 22/48 | (2006.01) |
|---|---|
| B60R 22/20 | (2006.01) |
| A44B 11/25 | (2006.01) |
| B60R 22/28 | (2006.01) |
| B60R 22/18 | (2006.01) |

(52) U.S. Cl.
CPC .......... *B60R 22/48* (2013.01); *A44B 11/2507* (2013.01); *A44B 11/2561* (2013.01); *B60R 22/20* (2013.01); *B60R 22/28* (2013.01); *B60R 2022/1806* (2013.01); *B60R 2022/281* (2013.01); *B60R 2022/4816* (2013.01)

(58) Field of Classification Search
CPC .......... B60R 22/20; B60R 2022/1806; B60R 22/28; B60R 2022/281; B60R 2022/286; B60R 22/18; A44B 11/2549
See application file for complete search history.

(56) References Cited

U.S. PATENT DOCUMENTS

| 2002/0180200 | A1 | 12/2002 | Tokugawa | |
|---|---|---|---|---|
| 2009/0038126 | A1 | 2/2009 | Krauss et al. | |
| 2011/0121630 | A1* | 5/2011 | Downey | B60N 2/206 297/378.1 |
| 2012/0175930 | A1* | 7/2012 | Jovicevic | B60N 2/12 297/331 |
| 2012/0198665 | A1 | 8/2012 | Krauss et al. | |
| 2014/0246845 | A1* | 9/2014 | Johnson | B60R 21/18 280/733 |

FOREIGN PATENT DOCUMENTS

DE    10 2008 052 332 A1    4/2010

* cited by examiner

*Primary Examiner* — Robert J Sandy
*Assistant Examiner* — Michael Lee
(74) *Attorney, Agent, or Firm* — Brinks Gilson & Lione

(57) ABSTRACT

A belt buckle arrangement for a seat belt system includes a belt buckle (1) with a spring-loaded locking mechanism for locking a belt tongue in a buckle housing (2). A spring-loaded push button (3) is displaceably guided on the buckle housing (2) for acting on the locking mechanism. A belt buckle status sensor (4) is connected with a data cable (5) directed out from the belt buckle (1). The buckle housing (2) is pivotably connected with a holder (6). Pivoting of the belt buckle (1) to the holder (6) is delimited by a stop (8) on the holder (6) abutting a stop surface (7) on the belt buckle (1). A sound-absorbing element (9) between the stop (8) and the stop surface (7) has a guide section (10) ensuring that the data cable (5) in the belt buckle (1) does not come in contact with the holder (6).

8 Claims, 3 Drawing Sheets

BELT BUCKLE ARRANGEMENT WITH A BELT BUCKLE PIVOTABLY MOUNTED ON A HOLDER

FIELD OF THE INVENTION

The present invention relates to a belt buckle arrangement for a seat belt system, comprising a belt buckle with a spring-loaded locking mechanism for locking a belt tongue which is inserted into a buckle housing, and with a push button displaceably guided under spring action on the buckle housing, for acting on the locking mechanism necessary for the unlocking of the belt buckle, and with a sensor detecting a status of the belt buckle, which sensor is connected with a data cable directed out from the belt buckle, wherein the buckle housing is pivotably connected with a holder which is able to be connected to the vehicle, and the pivoting movement of the belt buckle to the holder is delimited by a stop constructed on the holder and coming into abutment with a stop surface on the belt buckle.

BACKGROUND

A belt buckle arrangement of the above-mentioned type is known from US 2002/0180200 A1. In belt buckles comprising a sensor, the problem regularly presents itself that the data cable must be directed out from the belt buckle without lying against movable parts. The friction between the movable parts and the data cable could lead to wear of the data cable and therefore to its being damaged. In addition, the data cable could arrive into the path of movement of the movable part, so that the movement is impeded, which can lead to an impairment of the operability of the belt buckle.

In belt buckles which are mounted pivotably to the holder, in addition during the pivoting movement an abutting occurs of the stop, which is constructed on the holder, against a stop surface constructed on the belt buckle, which leads to an emission of noise. This can be felt to be intrusive.

It is therefore an object of the present invention to at least partially solve the problems described with regard to the prior art, and in particular to indicate a belt buckle arrangement in which damage to the data cable and an impairment of the functionality of the movable parts is prevented, and in which at the same time the noise emission of the belt buckle arrangement is reduced.

SUMMARY

These objects are achieved with a belt buckle arrangement having a sound-absorbing element arranged between the stop and the stop surface, which element has a guide section which cooperates with the data cable so that the data cable in the belt buckle does not come in contact with the holder.

The locking mechanism may in particular include one or more springs, a catch pivotably mounted on the buckle housing and securing the belt tongue in the locking position, a securing pin securing the catch in the locking position, and a spring-loaded lever, which cooperates with the securing pin. In addition, an ejector is provided, cooperating with the belt tongue. The lever is pivotably mounted on the ejector—actuated by the buckle tongue—, in particular so that the spring engaging on the lever can stress the lever in an unlocking or respectively locking process from a neutral position either into the locking position or unlocking position. The lever is arranged here so that it holds the securing pin in the locking position so that the securing pin secures the catch in the locking position. However, the present invention is not concerned with the function of the locking mechanism.

The sensor may be arranged and configured in particular so that it can detect whether the belt tongue is inserted into the belt buckle, wherein the signals generated by the sensor are transmitted out from the belt buckle in particular via a multicore sheathed data cable. The holder has in particular such a dimension and is designed such that it also fastens the belt buckle securely to the vehicle in an accident situation, wherein the buckle housing and the holder are arranged pivotably with respect to one another with a correspondingly secure connection. Here, the element of the holder is conceived as a stop, which with a pivoting movement comes to abut against a stop surface constructed on the belt buckle. In particular, the stop is formed by a projection shaped accordingly on the holder. The stop surface on the belt buckle can be constructed on any element of the belt buckle, but is preferably constructed on the buckle housing.

The present invention now makes provision that a sound-absorbing element is arranged between the stop on the holder and the stop surface on the belt buckle, which sound-absorbing element, in particular owing to its shape and/or material properties, is suitable for absorbing the kinetic energy of the pivoting movement of the belt buckle when the stop strikes onto the stop surface, so that an impact noise is emitted only with minimal intensity. In addition, the sound-absorbing element is in particular shaped such that, or has a corresponding element such that it is prevented that during the pivoting movement in particular a friction occurs between the data cable and the holder and the data cable can arrive into the impact region between holder and belt buckle.

The sound-damping element therefore not only has the function of reducing a noise emission during the pivoting movement of the belt buckle, but also of providing an efficient guidance for the data cable of the sensor out from the belt buckle.

A particularly secure connection between the belt buckle and the holder can be achieved in particular in that the buckle housing is pivotably connected with the holder by means of a clamp surrounding a pin arranged in the holder, and which clamp is securely connected with the buckle housing. The clamp is, in particular, a band-shaped, metallic strip, which is clasped around the pin in the holder. The clamp is fastened to the buckle housing in particular by welding or riveting.

In such an embodiment, it is in particular conceived that the clamp is narrower in the region of the holder than in its region situated in the buckle housing, so that the stop surface, with which the stop of the holder comes into abutment, is constructed at the region of the clamp situated in the buckle housing.

In order to enable a simple assembly of the sound-absorbing element on the buckle housing, provision is made in particular that the sound-absorbing element is connected in a force-fitting and/or form-fitting manner with the buckle housing and/or with the clamp. For this, in particular suitable projections, hooks or similar can be provided on the sound-absorbing element, and corresponding recesses can be provided on the buckle housing or the clamp.

According to a further embodiment of the belt buckle arrangement, the guide section at least partially surrounds the holder in the region of the stop surface, so that a contact between data cable and holder is ruled out and/or so that the data cable cannot arrive between stop and stop surface. This means in particular that the guide sections project over the holder in the region of the stop surface within the belt buckle.

According to a further embodiment of the belt buckle arrangement, the holder is U-shaped and forms a stop respectively with the side walls, which come into abutment on two stop surfaces. Here, provision is made in particular that the pin, which is clasped around by the clamp, is arranged between the side walls of the U-shaped holder.

In this connection, provision is additionally made that the guide section is likewise constructed in a U-shape and surrounds by its U-arms a side wall of the U-shaped holder, wherein the data cable is guided around the U-arms of the guide section. In such a configuration, a side wall of the U-shaped holder therefore engages in the region of the stop surface into the region formed by the U-shaped guide section. In this region, the data cable is, however, prevented in fact by the U-arms of the guide section from arriving into the range of action of the stop and the stop surfaces.

The invention and the surrounding technical field are explained by way of example below with the aid of the figures, wherein it is to be pointed out that the figures show a preferred embodiment, but this is not, however, restricted thereto. There are shown diagrammatically:

BRIEF DESCRIPTION OF THE DRAWINGS

In FIG. 1 a belt buckle arrangement is illustrated with a belt buckle 1 and a holder 6. The belt buckle 1 comprises a buckle housing 2, on which a push button 3 is displaceably guided. The locking mechanism, which is not essential for the invention, for the locking securing of a belt tongue, is not illustrated.

DETAILED DESCRIPTION

Figure 1:
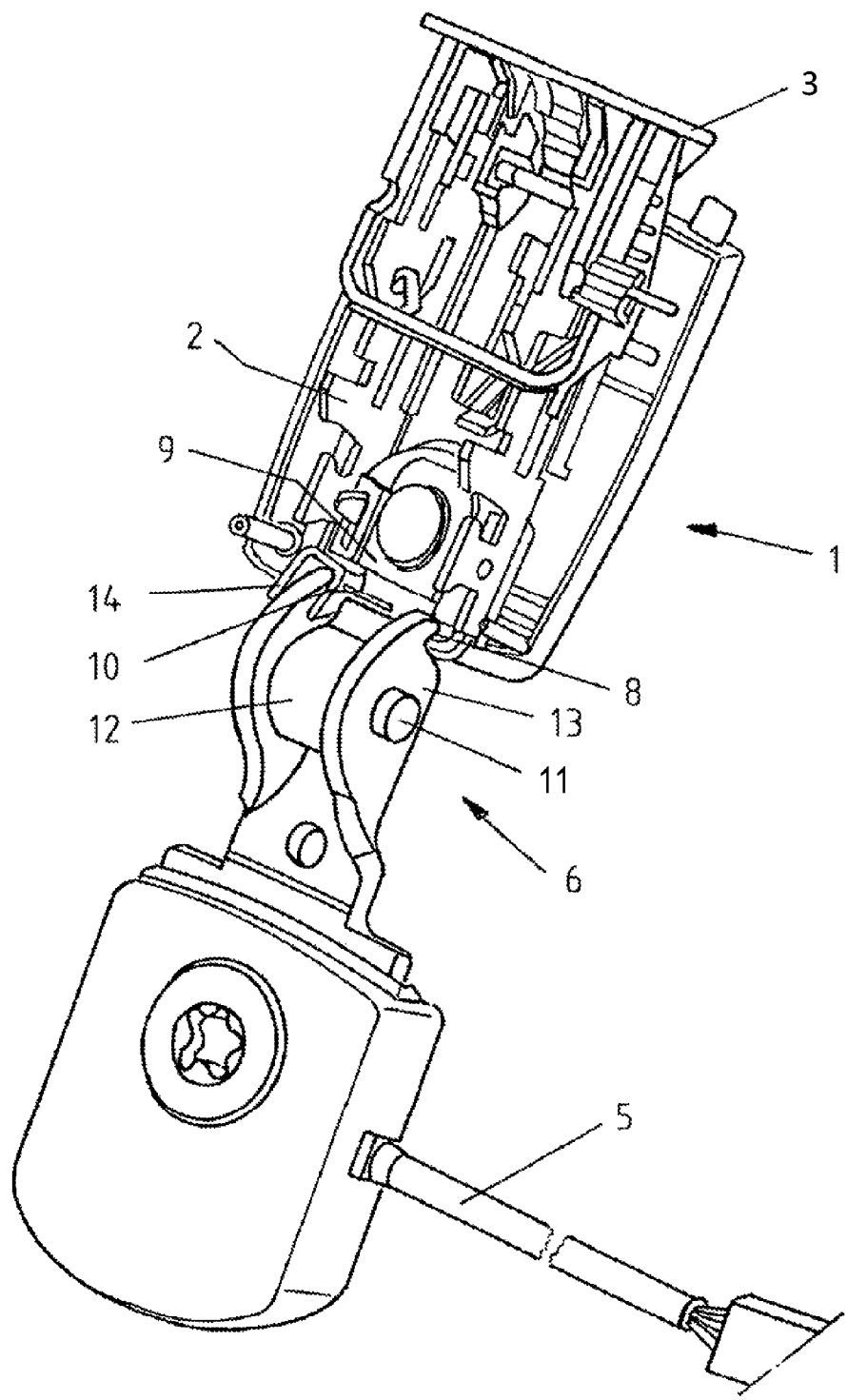
FIG. 1: a belt buckle arrangement in perspective view.

The belt buckle 1 is mounted pivotably on the holder 6 via a clamp 12, which is connected with the buckle housing 2. The holder 6 has a U-shaped cross-section, wherein a pin 11 is secured between side walls 13 of the holder 6, which pin is clasped around by the clamp 12, so that thereby a pivot axis is formed. A stop 8 is constructed respectively on the side walls 13, which stop comes into abutment against a stop surface 7 on the belt buckle 1 in the case of a pivoting movement of the belt buckle 1 relative to the holder 6. In the region between the stop 8 and the stop surface 7 a sound-absorbing element 9 is constructed, which is explained in further detail with reference to the further figures.

Figure 2:
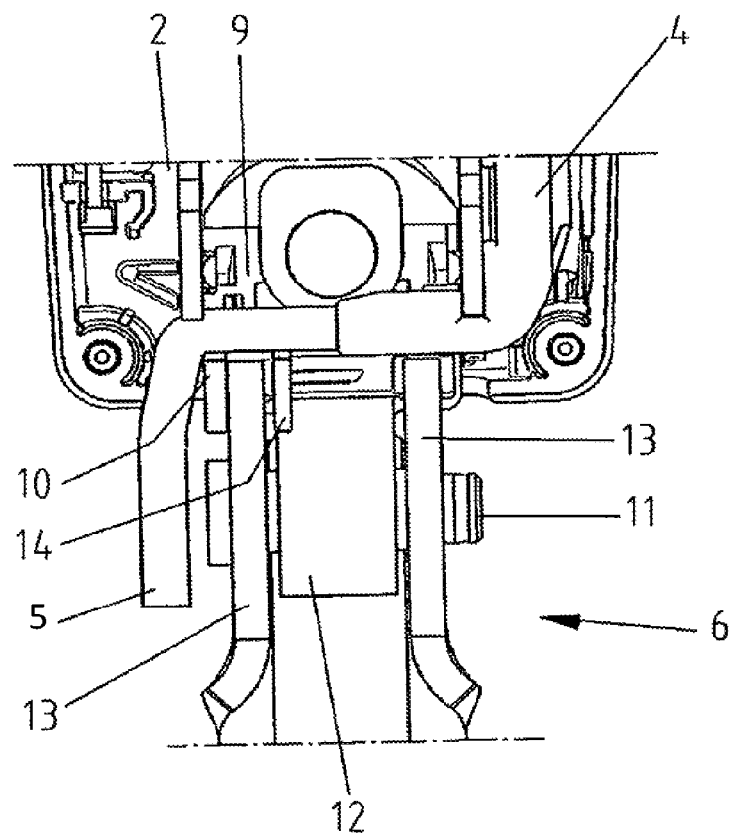
FIG. 2: a detail view of the stop region.

In FIG. 2 a view is illustrated onto the stop region according to FIG. 1, wherein in addition a sensor 4 is fastened to the buckle housing 2, which sensor can detect a belt tongue inserted into the buckle housing 2. The signals generated by the sensor 4 are directed out from the buckle housing 2 via a data cable 5. The elements of the holder 6 which are explained with reference to FIG. 1 are not dealt with again.

The present invention now makes provision that the sound-absorbing element 9 is shaped so that, and/or is manufactured from such a material that it can absorb the kinetic energy of the belt buckle 1 on impact of the stop 8 onto the stop surface 7, so that the noise emission is reduced. For this, the sound-absorbing element 9 engages with lateral wings 7a between the two stops 8, situated on the side walls 13 of the holder 6, and the stop surfaces 7. In addition, the sound-absorbing element 9 has a guide section 10, which is constructed so that, and cooperates with the data cable 5 so that the data cable 5 in the belt buckle 1 does not come in contact with the holder 6.

Figure 3:
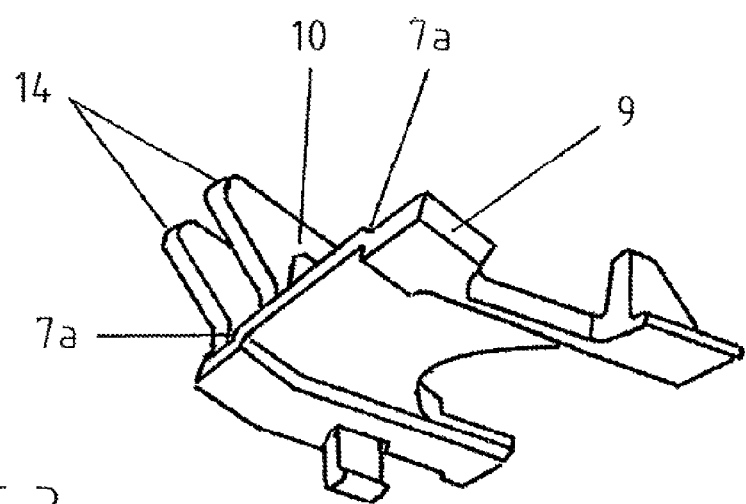
FIG. 3: a sound-absorbing element.

In order to prevent a contact of the data cable 5 with the holder 6, a U-shaped guide section 10 is constructed on the sound-absorbing element 9, as is illustrated in detail in FIG. 3. The U-shaped guide section 10 surrounds here by its U-arms 14 a side wall 13 of the holder 6 in the region of the stop 8.

Figure 4:
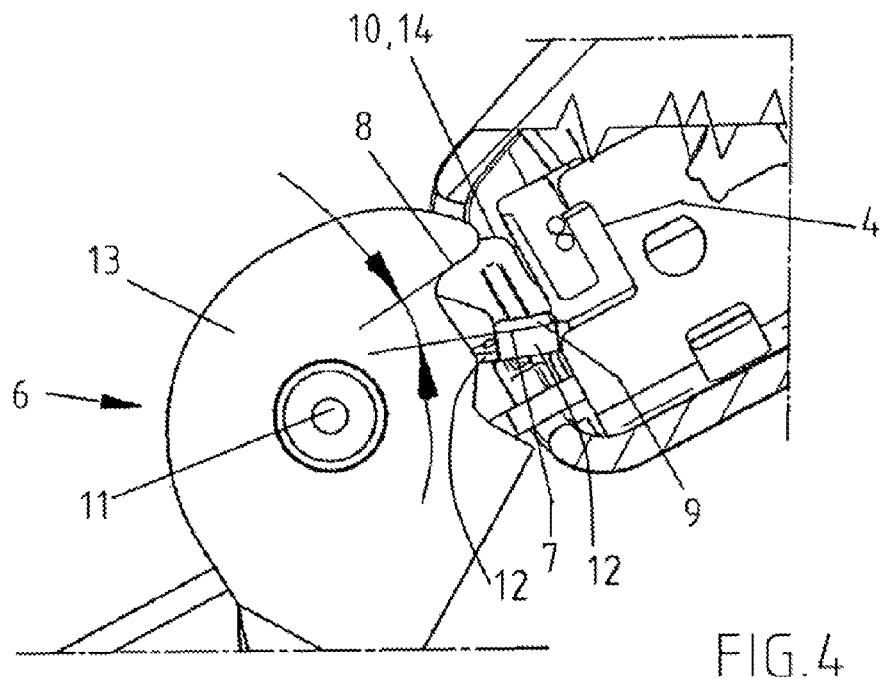
FIG. 4: a side view of the stop region in a first position
Figure 5:
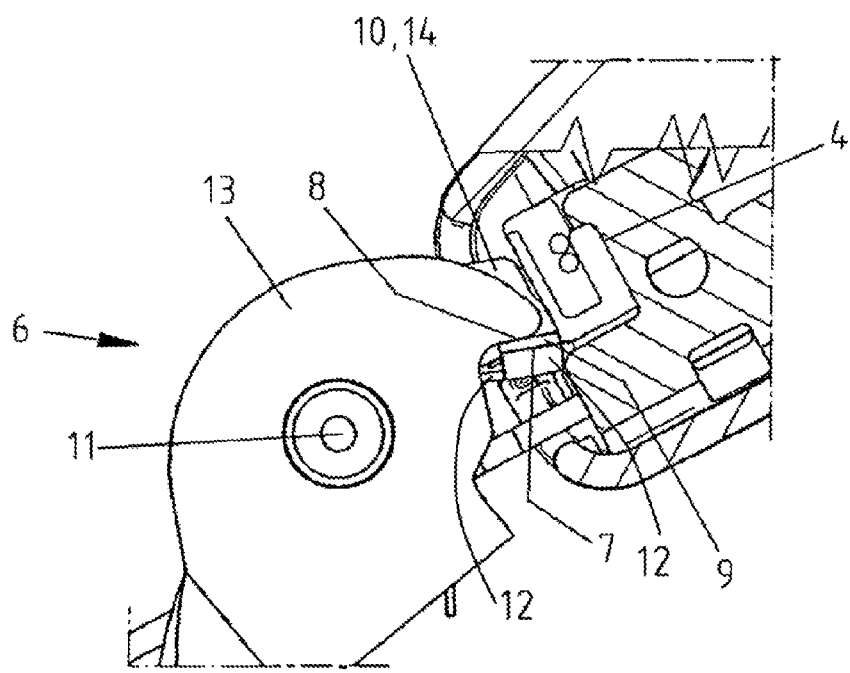
FIG. 5: the stop region of FIG. 4 in a pivoted position.

The configuration of the sound-absorbing element 9 and its arrangement with respect to the holder 6 are also illustrated in the side views of the stop region illustrated in FIGS. 4 and 5. In FIGS. 4 and 5 different pivoting positions of the belt buckle 1 with respect to the holder 6 are illustrated, wherein in FIG. 5 the holder 6 lies with the stop 8 against the stop surface 7 of the belt buckle 1.

It can be seen from these illustrations that the data cable 5, connected with the sensor 4, cannot arrive in the region between stop 8 and stop surface 7, because the U-arms 14 of the guide section 10 project in the direction of the push button—not illustrated here—of the belt buckle 1 over the side walls 13 of the holder 6. In addition, it can be readily seen that the sound-absorbing element 9 is constructed between the stop 8 and the stop surface 7 and therefore reduces the noise emission.

The present invention entails the advantage that the sound-absorbing element 9 not only reduces the noise emission of the belt buckle 1 which is pivotably mounted on the holder 6, but also that at the same time this serves for the guidance of the data cable 5 which is connected with the sensor 4.

While the above description constitutes the preferred embodiments of the present invention, it will be appreciated that the invention is susceptible to modification, variation and change without departing from the proper scope and fair meaning of the accompanying claims.

What is claimed is:
1. A belt buckle arrangement for a seat belt system, comprising a belt buckle with a spring-loaded locking mechanism for locking a belt tongue inserted into a buckle housing, and with a push button displaceably guided under spring action on the buckle housing for acting on the locking mechanism, and with a sensor detecting a status of the belt buckle, the sensor being connected with a data cable directed out from the belt buckle,
wherein the buckle housing is pivotably connected with a holder connectable to the vehicle, thereby being capable of making a pivoting movement,
wherein the pivoting movement of the belt buckle to the holder is delimited by a stop constructed on the holder and coming into abutment with a stop surface on the belt buckle, and
wherein a sound-absorbing element is arranged between the stop and the stop surface, the sound-absorbing element having a guide section positioned in a location where the guide section blocks the data cable in the belt buckle from moving into a position, in which the data cable may come into contact with the holder along the pivoting movement of the holder.
2. The belt buckle arrangement according to claim 1, wherein the buckle housing is pivotably connected with the holder via a clamp surrounding a pin arranged in the holder, the clamp being securely connected with the buckle housing.

3. The belt buckle arrangement according to claim 2, wherein the clamp is narrower in a clamp portion within the holder than in a clamp portion situated in the buckle housing, so that the stop surface, with which the stop of the holder comes into abutment, is located on the clamp portion situated in the buckle housing.

4. The belt buckle arrangement according to claim 1, wherein the sound-absorbing element is connected in a force-fitting manner or in a form-fitting manner with one of the buckle housing and the clamp.

5. The belt buckle arrangement according to claim 1, wherein the guide section at least partially surrounds the holder in the region of the stop surface, preventing a contact between data cable and holder, and/or that the data cable cannot arrive between stop and stop surface.

6. The belt buckle arrangement claim 5, wherein the guide section prevents the data cable from moving into any location between the stop and the stop surface.

7. The belt buckle arrangement according to claim 1, wherein the stop surface is a first stop surface and a second stop surface is arranged on the belt buckle, wherein the stop of the holder is a first stop and the holder has a second stop, each of the first and second stops abutting one of the first and second stop surfaces, wherein the holder is U-shaped with two side walls, each of the two side walls respectively forming one of the first and second stops.

8. The belt buckle arrangement according to claim 7, wherein the guide section is also constructed in a U-shape with U-arms surrounding one of the two side walls of the U-shaped holder, wherein the data cable is guided around the U-arms.

* * * * *